Patented Feb. 15, 1944

2,341,948

UNITED STATES PATENT OFFICE 2,341,948

POLYMERIZATION OF ACYCLIC TERPENES

Alfred L. Rummelsburg, Wilmington, Del., assignor to Hercules Powder Company, Wilmington, Del., a corporation of Delaware No Drawing. Application January 20, 1942, Serial No. 427,442

21 Claims. (Cl. 260—92.6)

This invention relates to the polymerization of acyclic terpenes having three double bonds per molecule and to the products formed thereby. More particularly, it relates to an improved method of polymerizing acyclic terpenes having three double bonds per molecule whereby an improved product is obtained.

It is possible to polymerize acyclic terpenes having three double bonds per molecule, such as, allo-ocimene by heating at temperatures near their boiling points for extended periods of time. Due to the extensive reaction periods required, however, this method is unattractive economically. The art discloses, in addition, that acyclic terpenes may be polymerized in the presence of sulfuric acid or a sulfuric acid-acetic acid catalyst. The product is described as a brown liquid resin which analysis shows to be composed of polymers of the acyclic terpene and various by-products. The use of sulfuric acid, however, causes charring of the acyclic terpene or its polymers, and as a consequence the product is dark in color and is obtained in reduced yield. Furthermore, sulfuric acid is a strong sulfonating agent, and the sulfonation products formed by its use contribute to reducing the yield of polymer and necessitate additional operations to secure the polymerized acyclic terpene in purified form. The removal of the sulfuric acid type of catalyst is particularly difficult inasmuch as the sulfonic acids present tend to act as an emulsifying agent during any attempted water washing. The final polymers obtained with the use of such a catalyst will always contain traces of combined sulfur as an impurity.

Now, in accordance with this invention it has been found that a much improved process for the polymerization of acyclic terpenes having three double bonds per molecule results from the use of a siliceous material or a metal silicate as a catalyst for the reaction. Broadly, the improved process involves contacting the acyclic terpene in liquid phase with this catalyst for a period sufficiently long to give a substantial yield of polymerized product. Thereafter, the catalyst is separated from the reaction mixture by any convenient method, as filtration and any unpolymerized constituents removed. Although the catalyst need not necessarily be calcined prior to use, it will be found that much better results are obtainable when the catalyst is subjected to prior calcination at a temperature between about 200° C. and about 500° C.

The catalysts which have been found capable of effecting polymerization of an acyclic terpene having three double bonds per molecule may be divided into two categories. The first comprises siliceous or silica-containing materials. Thus, naturally-occurring siliceous materials as the various forms of diatomite, as diatomaceous earth, tripolite, kieselguhr, infusorial earth, and their equivalents may be employed. Artificially prepared siliceous materials, such as, silica gel, Sil-O-Cel, and their equivalents may be employed. These siliceous or silica-containing materials are all characterized in that the individual particles of the material are of a porous nature. The second class of catalytic materials comprises silicates of the metals of group II of the periodic table, such as, calcium, magnesium, zinc, cadmium, etc., silicates; also silicates of the metals of group III of the periodic table, such as, aluminum, scandium, etc., silicates. These metal silicates may be prepared synthetically or naturally-occurring materials containing substantial quantities of the desired metal silicate may be employed. Hence, natural-occurring aluminum silicates, such as, the various fuller's earths, various clays, as bentonite, etc., bauxite, etc., may be employed.

Having described broadly the basic concept of the present invention, certain examples are given as illustrative of particular embodiments. These, however, are in no way to be taken as being limiting. All parts and percentages in the specification are by weight unless otherwise indicated.

Example 1

A quantity of fuller's earth was calcined at 400° C. for 2 hours. To 5 parts of this calcined material were added fifty-two parts of allo-ocimene, and the mixture was heated at 70° C. with continuous agitation for 0.5 hour. The allo-ocimene employed was 93% pure, the remainder of the constituents being cyclic terpenes. After the heat treatment at 70° C. for 0.5 hour, the reaction mixture was then heated for about 0.5 hour at 185° C. with continued agitation. After cooling, the reaction mixture was filtered from the catalyst and subjected to vacuum distillation employing a final bath temperature of 160° C. and a pressure of 11 mm. to remove any unpolymerized constituents. The polymerized product was a viscous oil having a color grade of N+ (U. S. Rosin Type) and was obtained in an amount corresponding with an 88% yield. This product consisted substantially entirely of polymeric allo-ocimene, at least 70% of which was the dimer.

Example 2

A sample of fuller's earth was first calcined at 400° C. for a period of 2 hours. To 50 parts of this calcined catalyst were added 500 parts of 98% myrcene, and the mixture was vigorously agitated for a period of 2 hours at 90° C., and for a further period of 6 hours at 130° C. The crude reaction product was then filtered to remove the catalyst while hot, and the filtrate was distilled at 20 mm. pressure using a final bath temperature of 180° C. A yield of 420 parts of polymerized myrcene was thereby obtained. It was a viscous oil having a color of N (U. S. Rosin Type). The predominating constituent of the product was the dimer of myrcene.

Example 3

A quantity of synthetic magnesium silicate (Magnesol), having a bulk density of 12.5 and a particle size of 100 to 325 mesh, was calcined at 325° C. for 1 hour. Three hundred parts of 85% allo-ocimene were vigorously agitated with 40 parts of this calcined magnesium silicate catalyst for a period of 4 hours at 90° C., and for a further period of 2 hours at 135° C. The crude reaction product was filtered to remove the catalyst while hot, and the filtrate was distilled at 20 mm. pressure using a final bath temperature of 180° C. A yield of 240 parts of polymerized allo-ocimene was obtained. It was a viscous oil, containing at least 70% of the dimer of allo-ocimene.

Example 4

A quantity of synthetic aluminum silicate having the formula $3Al_2O_3 \cdot 4SiO_2 \cdot H_2O$ was calcined at 325° C. for 1 hour. To 40 parts of this calcined catalyst were added 200 parts of 98% allo-ocimene, and the mixture was vigorously agitated for a period of 1 hour at 120° C., and for a further period of 5 hours at 190° C. in an atmosphere of carbon dioxide. The crude reaction product was then filtered to remove the catalyst, and the filtrate was distilled at 15 mm. pressure using a final bath temperature of 180° C. One hundred sixty-four parts of polymerized allo-ocimene were thereby obtained. It was a viscous oil containing more than 70% by weight of the dimer of allo-ocimene.

Example 5

A quantity of dried silica gel was calcined at 325° C. for a period of 1 hour. Forty parts of this calcined catalyst and 200 parts of 100% myrcene were vigorously agitated at 120° C. for 1 hour and for a further period of 5 hours at 190° C. in an atmosphere of carbon dioxide. The crude reaction product was filtered to remove the catalyst, and the filtrate was distilled at 15 mm. pressure using a final bath temperature of 180° C. A viscous oil was obtained in the amount of 85 parts. The resulting product contained more than 70% of the dimer of myrcene, the other constituents being higher polymers of myrcene.

Although allo-ocimene and myrcene were the particular materials employed in the examples, any acyclic terpene having three double bonds per molecule, as for example, allo-ocimene, ocimene, myrcene, etc., may be employed. In particular, allo-ocimene is preferred inasmuch as, in addition to having three double bonds per molecule, this compound has the double bonds in a triply conjugated arrangement. Hereinafter, in this specification, an acyclic terpene having three double bonds per molecule will be referred to for convenience merely as an acyclic terpene.

A substantially pure acyclic terpene has been employed in each of the illustrative examples. However, it will be understood that in carrying out this invention in its broadest aspects the acyclic terpene may be used in a substantially pure state or in an admixture with other terpenes, which admixture, however, contains substantial quantities of the acyclic terpene. The other terpenes may or may not polymerize in the reaction depending upon their nature and the conditions of the reaction. For example, an impure allo-ocimene to which the present processes may be applied is that obtained by the pyrolysis of α-pinene. It has been found that when α-pinene is pyrolyzed under suitable conditions of temperature and contact time of the vapor with the reaction tube, there is produced a substantial quantity of allo-ocimene, in addition to dipentene and other complex terpenes in quantities determined by the conditions of the reaction. This method is described in detail in the application for U. S. Letters Patent by A. L. Rummelsburg, Serial No. 393,241, filed May 13, 1941. In addition, the pyrolysis of β-pinene at say 400° C. yields as much as 67% myrcene in conjunction with other terpenes.

The examples have shown the polymerization without the use of a solvent for the acyclic terpene; however, any inert, volatile, organic solvent for the acyclic terpene may be employed, as desired. Examples of such solvents are aromatic hydrocarbons, such as, benzene, toluene, xylene, cymene, etc.; aliphatic hydrocarbons, such as, gasoline, petroleum ether, V. M. & P. naphtha, butane, hydrogenated petroleum naphtha, cyclohexane, decahydronaphthalene, etc. Although the aforesaid hydrocarbon solvents are preferred, other solvents such as the chlorinated hydrocarbons, chloroform, ethylene dichloride, carbon tetrachloride, trichloroethylene, tetrachloroethane, pentachloroethane, propylene dichloride, monochlorobenzene, etc., may be employed as desired. When a solvent is used, the concentration of the acyclic terpene in the solution should preferably be within the range of from about 10% to about 75% by weight based on the weight of the solution.

It will be noted that the catalyst, fuller's earth, of Example 1 was calcined prior to use. In general, calcination of the catalyst prior to use is highly desirable; however, the catalysts contemplated herein need not necessary be calcined prior to use. Calcination, when employed, will be at temperatures of from 200° C. to 500° C., preferably from 300° C. to 400° C., and for a period of 30 minutes or more.

The polymerization inhering in this invention may be carried out over a wide range of temperature, and some polymerization will take place at normal room temperature (20° C.). For practical operation, however, a temperature between about 50° C. and about 250° C., and preferably between about 60° C. and about 150° C., will be employed. The reaction time will vary from about 0.25 to about 8.0 hours or more, and will preferably range from about 0.5 to about 2.0 hours. Although any desired ratio of catalyst to acyclic terpene may be used, in practical operation this ratio will vary from about 0.001 to about 1.0, preferably between about 0.02 and about 0.1.

As illustrated by Example 1, the catalyst may be removed from the reaction mixture by any desired means, as by simple filtration. Unpolymerized constituents may then be removed from the reaction mixture by methods, such as, for example, distillation under reduced pressure, steam distillation, etc. The resulting polymeric acyclic terpene product is a mixture of polymers in which the dimer predominates. Generally, the dimer will be present in an amount of at least 70% by weight. This polymer mixture is a pale-colored viscous oil. The color of this polymeric mixture will generally grade on the average between about I and about X (U. S. Rosin Type). It will have a thiocyanate value between about 110 and about 200.

Since this polymeric mixture consists of a mixture of the dimer, trimer, tetramer and higher polymers in which the dimer predominates, it may be vacuum distilled for separation of the constituents having similar orders of polymerization. For example, the dimer may be readily distilled leaving the trimer and higher polymers as residue. The dimer will be found to have the following average characteristics:

Boiling point (4 mm.) _____ C__ 142–143°
$d_o^{23}$ _____ 0.8654
$n_d^{23}$ _____ 1.508

In a similar manner, the trimer may be separated from the tetramer and higher polymers.

For convenience, a batch process was employed in the examples. Continuous operation, however, utilizing the principles herein described is contemplated. For example, the desired acyclic terpene may be passed through a suitable reaction tube which has been packed with the catalyst described herein at temperatures specified herein for batch process operation. The use of an inert atmosphere such as carbon dioxide or nitrogen during the polymerization facilitates the production of the palest colored products.

The liquid acyclic terpene polymers produced by virtue of this invention are much more unsaturated than the liquid polymeric cyclic terpenes, such as, liquid polydipentene, "Dipolymer," liquid polypinene, etc. Hence, they react more readily with many other compounds. For example, maleic anhydride will react more readily with the liquid acyclic terpene polymers and the resulting product can be further esterified with mono- and polyhydric alcohols. The products are resins which may be incorporated in protective coatings such as paints, lacquers, varnishes, etc. These liquid acyclic terpene polymers may also be reacted with a phenol and the resulting product in turn reacted with formaldehyde to form resins which are soluble in drying oils. Additionally, these polymers may be sulfonated to yield products having sudsing and wetting-out properties in aqueous solution. The liquid acyclic terpene polymers themselves may be employed as substitutes for drying oils in the preparation of paints, varnishes and enamels.

The use of the described process for acyclic terpene polymerization possesses several important advantages over any methods heretofore available. In the first place, there is obtained a considerably increased velocity of polymerization as compared with heat polymerization. The polymeric products are pale in color and result in high yield. The problem heretofore existing relating to removing the catalyst is non-existent with the present process. The use of the siliceous materials or metal silicates as catalysts also enables operation without any side reactions taking place between the catalyst and acyclic terpene and/or polymerized acyclic terpene. Exceedingly pure polymers result from the use of the described method. Such a result is very difficult if not impossible to obtain by any of the prior art methods.

What I claim and desire to protect by Letters Patent is:

1. The process of polymerizing an acyclic terpene having three double bonds per molecule which comprises contacting said acyclic terpene in liquid phase with a material selected from the group consisting of porous siliceous materials, silicates of metals of group II and silicates of metals of group III.

2. The process of polymerizing an acyclic terpene having three double bonds per molecule which comprises contacting said acyclic terpene in liquid phase with a material selected from the group consisting of porous siliceous materials, silicates of metals of group II and silicates of metals of group III, which material has been calcined prior to use by heating at a temperature between about 200° C. and about 500° C.

3. The process of polymerizing an acyclic terpene having three double bonds per molecule which comprises contacting said acyclic terpene in liquid phase with a porous siliceous material.

4. The process of polymerizing an acyclic terpene having three double bonds per molecule which comprises contacting said acyclic terpene in liquid phase with a silicate of a metal of group II.

5. The process of polymerizing an acyclic terpene having three double bonds per molecule which comprises contacting said acyclic terpene in liquid phase with a silicate of a metal of group III.

6. The process of polymerizing an acyclic terpene having three double bonds per molecule which comprises contacting said acyclic terpene in liquid phase with a porous siliceous material which has been calcined prior to use by heating at a temperature between about 200° C. and about 500° C.

7. The process of polymerizing an acyclic terpene having three double bonds per molecule which comprises contacting said acyclic terpene in liquid phase with a synthetic silicate of a metal of group II, which silicate has been calcined prior to use by heating at a temperature between about 200° C. and about 500° C.

8. The process of polymerizing an acyclic terpene having three double bonds per molecule which comprises contacting said acyclic terpene in liquid phase with a naturally-occurring silicate of a metal of group III, which silicate has been calcined prior to use by heating at a temperature between about 200° C. and about 500° C.

9. The process of polymerizing an acyclic terpene having three double bonds per molecule which comprises contacting said acyclic terpene in liquid phase with silica gel which has been calcined prior to use by heating at a temperature between about 200° C. and about 500° C.

10. The process of polymerizing an acyclic terpene having three double bonds per molecule which comprises contacting said acyclic terpene in liquid phase with synthetic magnesium silicate which has been calcined prior to use by heating at a temperature between about 200° C. and about 500° C.

11. The process of polymerizing an acyclic terpene having three double bonds per molecule which comprises contacting said acyclic terpene in liquid phase with fuller's earth which has been calcined prior to use by heating at a temperature between about 200° C. and about 500° C.

12. The process of polymerizing allo-ocimene which comprises contacting said material in liquid phase with silica gel which has been calcined prior to use by heating at a temperature between about 200° C. and about 500° C.

13. The process of polymerizing allo-ocimene which comprises contacting said material in liquid phase with synthetic magnesium silicate which has been calcined prior to use by heating at a temperature between about 200° C. and about 500° C.

14. The process of polymerizing myrcene which comprises contacting said material in liquid phase with fuller's earth which has been calcined prior to use by heating at a temperature between about 200° C. and about 500° C.

15. The process of polymerizing allo-ocimene which comprises contacting said material in liquid phase with silica gel which has been calcined prior to use by heating at a temperature between about 300° C. and about 400° C.

16. The process of polymerizing allo-ocimene which comprises contacting said material in liquid phase with synthetic magnesium silicate which has been calcined prior to use by heating at a temperature between about 300° C. and about 400° C.

17. The process of polymerizing myrcene which comprises contacting said material in liquid phase with fuller's earth which has been calcined prior to use by heating at a temperature between about 300° C. and about 400° C.

18. The process of polymerizing an acyclic terpene having three double bonds per molecule which comprises contacting said acyclic terpene in liquid phase at a temperature between about 50° C. and about 250° C. with a material selected from the group consisting of porous siliceous materials, silicates of metals of group II and silicates of metals of group III, which material has been calcined prior to use by heating at a temperature between about 200° C. and about 500° C.

19. The process of polymerizing allo-ocimene which comprises contacting said material in liquid phase at a temperature between about 50° C. and about 250° C. with silica gel which has been calcined prior to use by heating at a temperature between about 300° C. and about 400° C.

20. The process of polymerizing allo-ocimene which comprises contacting said material in liquid phase at a temperature between about 50° C. and about 250° C. with synthetic magnesium silicate which has been calcined prior to use by treating at a temperature between about 300° C. and about 400° C.

21. The process of polymerizing myrcene which comprises contacting said material in liquid phase at a temperature between about 50° C. and about 250° C. with fuller's earth which has been calcined prior to use by heating at a temperature between about 300° C. and about 400° C.

ALFRED L. RUMMELSBURG.